(12) United States Patent
Kane

(10) Patent No.: US 6,934,435 B2
(45) Date of Patent: Aug. 23, 2005

(54) MICROFLUIDIC PUMP SYSTEM FOR CHEMICAL OR BIOLOGICAL AGENTS

(75) Inventor: David Kane, Rowley, MA (US)

(73) Assignee: Areté Associates, Sherman Oaks, CA (US)

(*) Notice: Subject to any disclaimer, the term of this patent is extended or adjusted under 35 U.S.C. 154(b) by 0 days.

(21) Appl. No.: 10/265,278

(22) Filed: Oct. 4, 2002

(65) Prior Publication Data

US 2005/0084203 A1 Apr. 21, 2005

Related U.S. Application Data

(60) Provisional application No. 60/327,760, filed on Oct. 5, 2001.

(51) Int. Cl.[7] .................................................. G02B 6/26
(52) U.S. Cl. ........................ 385/16; 385/17; 385/140; 385/147
(58) Field of Search .............................. 385/2, 6, 7, 8, 385/16–18, 140, 147; 417/413.1

(56) References Cited

U.S. PATENT DOCUMENTS 5,960,131 A * 9/1999 Fouquet et al. ............... 385/17

2002/0098097 A1 * 7/2002 Singh ........................ 417/413.1

* cited by examiner

Primary Examiner—Phan T. H. Palmer
(74) Attorney, Agent, or Firm—Peter I. Lippman

(57) ABSTRACT

In one form, one or more micropumps and optical microdetectors are on a substrate, ideally many per square centimeter, each detecting fluid moved by its pump. A second form has many waveguides and, intersecting each, a fluid chamber controlling radiation in the guide; the device is best immersed in a fluid that moves in and out of chambers, intercepting radiation to yield position data—transmitted e.g. wirelessly for external reception. The device can be a chip in a live creature (e.g. implanted, or in blood); data go to a wireless receiver. Each guide ideally couples to a radiation source and detector. In a third form a membrane deflects a radiation-interacting fluid in a plenum; liquid moves between the plenum and a tube. The plenum cross-section is many times the tube's; radiation in the tube is monitored. Deflected liquid in the tube controls specimen movement to and from the tube.

32 Claims, 5 Drawing Sheets

MICROFLUIDIC PUMP SYSTEM FOR CHEMICAL OR BIOLOGICAL AGENTS

RELATED DOCUMENT

Figure 1:
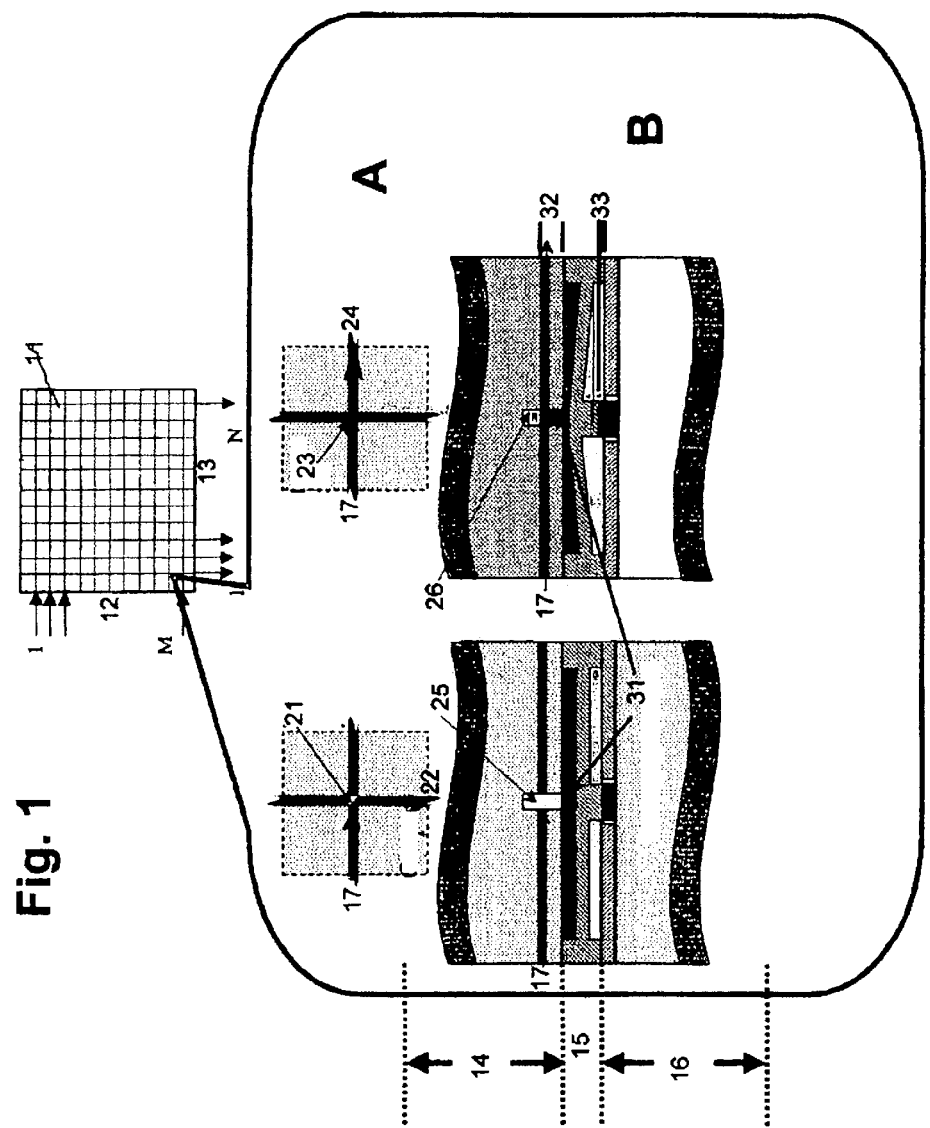

Provisional application Ser. No. 60/327,759, which was filed on the same date as the priority application of the present document and was later filed as nonprovisional application 10/265,277, is incorporated in its entirety into the present document. It is relevant for its details about an optical cross-connect.

This application claims benefit of 60/327,760 filed Oct. 5, 2001.

RELATED DOCUMENT

There has been an ongoing research effort to integrate microfluidic-based systems with appropriate sensors and analytical components to effectively miniaturize chemical and biological assays with the creation of lab-on-a-chip technology. Many companies have brought the lab-on-a-chip technology to the forefront of microelectromechanical system (MEMS) applications.

TECHNOLOGICAL INNOVATION 1.1 Application of LightLinks™ MicroFluidic Pump Technology There has been an ongoing research effort to integrate microfluidic-based systems with appropriate sensors and analytical components to effectively miniaturize chemical and biological assays with the creation of lab-on-a-chip technology. While many companies have brought the lab-on-a-chip technology to the forefront of microelectromechanical system (MEMS) applications, LightLinks™ contributes a new aspect to microfluidics and sample mixing by combining a pumping mechanism and detection mechanism in the same substrate. "LightLinks™" is a trademark for a proprietary system of Areté Associates which includes a microfluidic pump, diaphram membrane, waveguide based optical-cross connect and an actuator substrate. Its optical-cross connect is detailed in copending provisional application Ser. No. 6602289883, the subject matter of which is incorporated in its entirety in the present document.

Integrating the microfluidic pump system of this invention into a microchip allows the invention to be applied to both chemical and biological assays. The micropump system essentially combines the benefits of miniaturization, integration and automation while also solving complex design problems such as controlling and directing sample flow at intersections of micron scale.

The defining attribute of microassays is the small amounts of gas or liquid material required for sample reaction. This economy of scale affords the ability to test more compounds or drug candidates for a desired or undesired reaction. In addition, microreaction technology offers efficient heat transfer, optimized mixing and safer processing, in other words, better reaction control not to mention reduced waste. With both the sample size and reactions being so small, multiple individual assays can be run in parallel, affording more reliable results. Such reaction systems can be constructed in a parallel fashion to increase through-put, or specimens can be attached to parallel systems to allow multiple different assays to be performed.

1.2 Concept and Major Elements

This invention concerns a planar silicon, silica or polymer waveguide and chemistry/biology sampling chip utilizing many of the elements in the MEMS based LightLinks™ all optical switch technology incorporated by reference. It is a non-blocking planar waveguide based switch fabric illustrated in VARIABLE(_Ref525092996~. As a 3-layer substrate sandwich structure, the LightLinks™ switch includes a waveguide, membrane and actuator substrates. Central to the operation of this switch is the actuator used to fill and empty the columns and the pressurized gas as shown. The switch works by moving the sample fluid located in the columns by $\Delta X$. It is this actuation aspect that serves as the pumping mechanism and circulation is caused by changes in relative pressure within the multiple chambers.

The microfluidic pump system of this invention takes advantage of the incompressibility of the index matching fluid and the ratios of the column to reservoir cross-sectional areas. An actuator extends $\Delta x$, displacing fluid up the column $\Delta X$ and completes the light circuit with fluid allowing light to continue traveling through the waveguide. $\Delta X/\Delta x$ ratios of >1000:1 are possible based on the column and reservoir cross sectional areas envisioned. The total internal reflection (TIR) is represented by a column of triangular cross-section located at the intersection of each input and output channel in the waveguide substrate. When a switched state is desired, the actuator is retracted by $\Delta x$ and the pressurized gas returns the column to its original location. With a lower index gas at the waveguide interface, total internal reflection occurs at the column-waveguide interface and the incoming light is switched 90°. Switch speed is dependent on the time it takes to move the column $\Delta X$. A 250:1 scale acrylic/polycarbonate prototype of a single actuator/fluid column junction with 500:1 stroke amplification has been demonstrated to verify the concept.

The concept of the microfluidic pump system of this invention incorporated into a chem/bio Chip utilizes the same elements as the LightLinks™ optical switch in a micro-pump configuration for moving the fluid into a sensor's field of view. An advantage provided by this pump configuration is that the fluid velocity ratios are proportional to the column to reservoir cross sectional areas. An actuator extends $\Delta x/dt$, displacing fluid up the column $\Delta X/dt$ and completes the light circuit with fluid allowing light to continue traveling through the waveguide. $\Delta X/dt/\Delta x/dt$ ratios of >1000:1 are possible based on the column and reservoir cross sectional areas envisioned. In this preferred embodiment, the top of the column is open to the external environment. In this configuration the microfluidic pump system is used as a displacement pump, expelling and drawing the agent of interest into the waveguide interaction region. Center-to-center distances for each sample site could be of the order of 100 $\mu$m–200 $\mu$m, with displacement frequencies in excess of 1 Megahertz. The resulting volumetric transfer rate is of the order of $10^{-5}$ liter/sec with a power consumption of 200 $\mu$W at 5 volts.

Multiple detection configurations are envisioned utilizing the microfluidic pump system of this invention. A preliminary list of detection approaches that would utilize the microfluidic pump and planar waveguide include, but are not limited to:

Fluorescence
Polarization
Refractive index variation
Acousto-Optic Tunable Filter
Fabret-Perot Interferometry
"$\mu$-Scale" Grating Spectrometer The microfluidic pump system of the invention in combination with the waveguide can detect both chemical and biological agents in liquids or in gases. Examples of such detection applications include but are not limited to blood or other bodily fluid monitoring, use as a chemical sensor for process control, leak detection or as a safety monitor, or a biological sensor for use in detecting and monitoring toxins. Other examples described below include monitoring a heating ventilated air conditioner (HVAC), monitoring a fuel injection system, monitoring a chemical processing system, or even alerting an alarm.

The microfluidic pump system alone, can be used in pump applications such as dispensing drugs, externally or as an implant, as an assay dispenser, as a means of moving liquids and gases within the field of view of a detection system, or even to assist a heart pump, or other similar applications.

Figure 2:
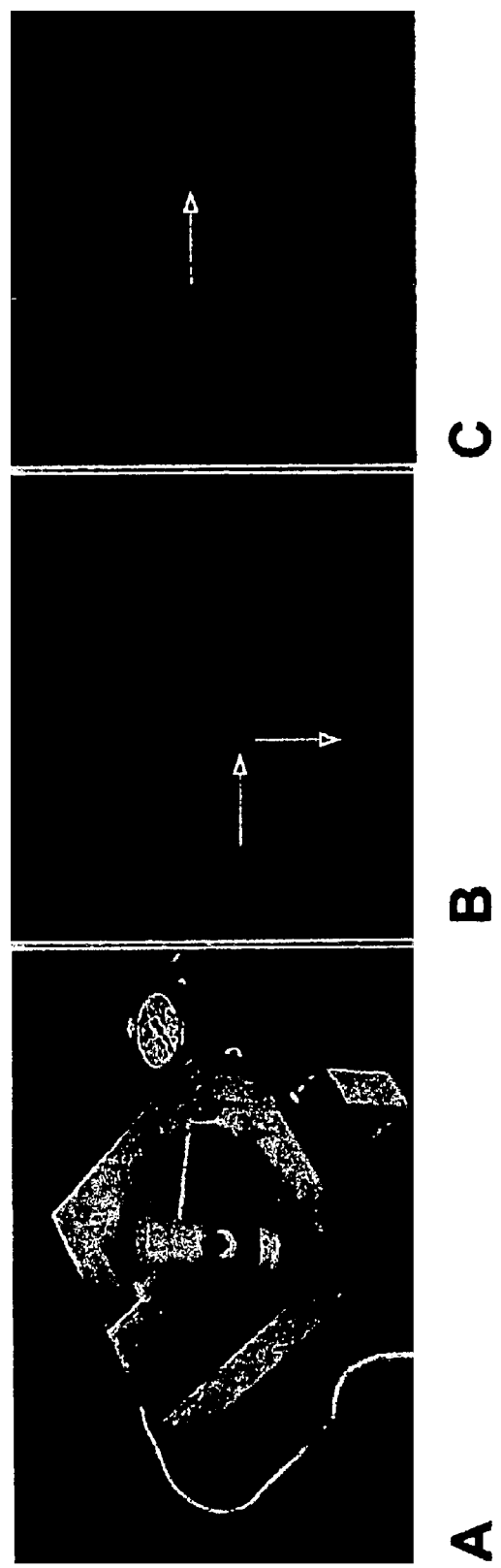
Figure 3:
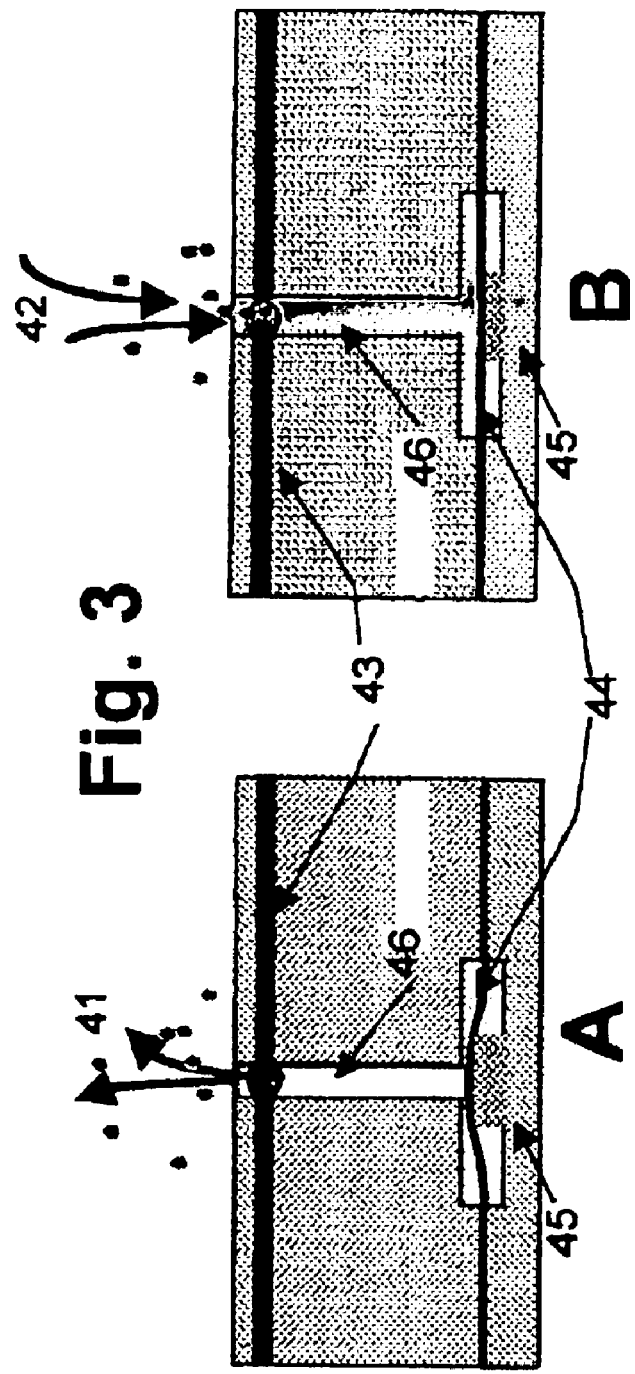
Figure 4:
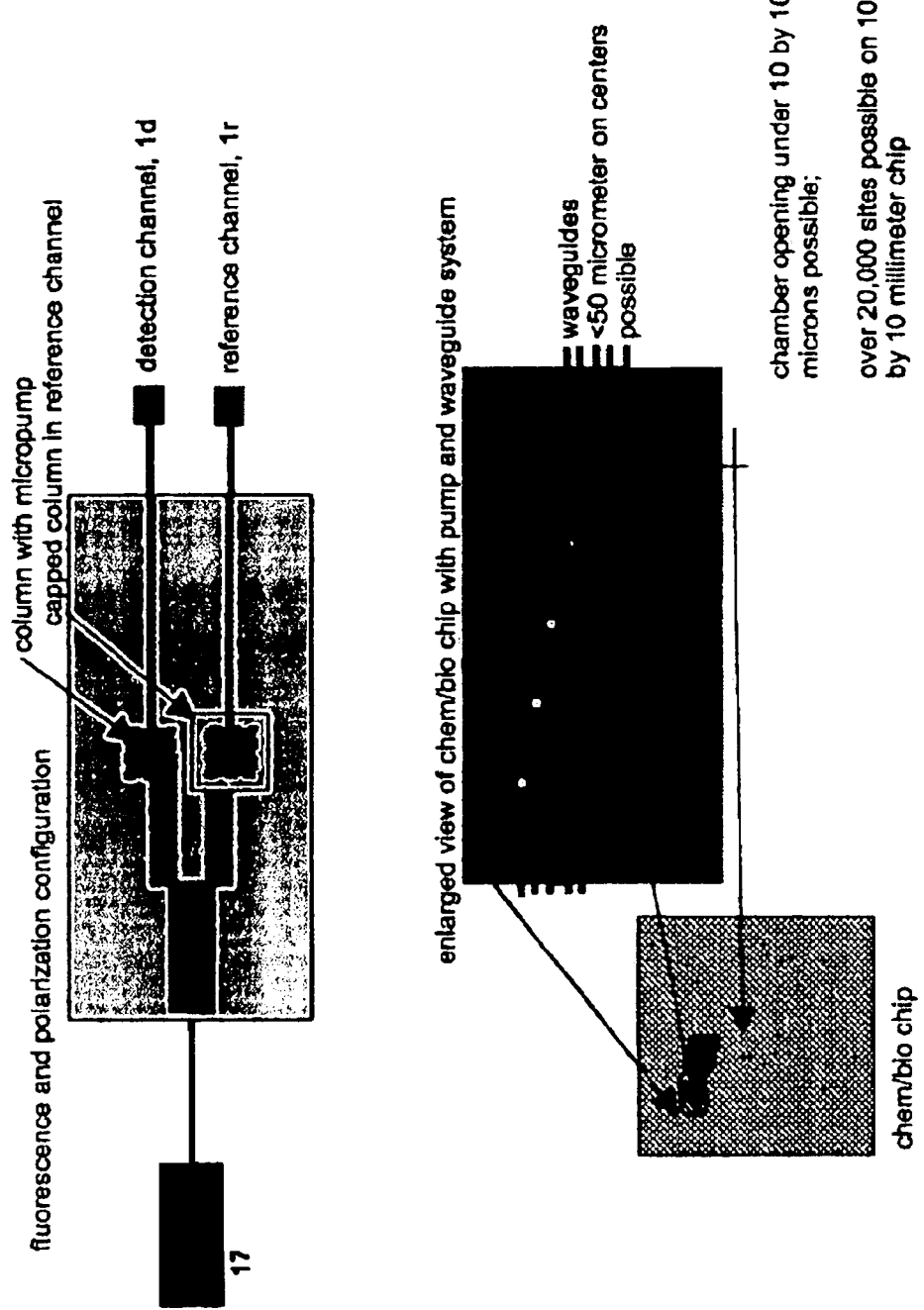

FIGS. 1–4 shows one preferred configuration for a detection method where a laser source is used to detect either fluorescence or polarization characteristics of a particular agent. The source propagates through the waveguide and interacts with the agent e.g. sample chemical, in the open column and continues down the waveguide to a detector. A capped column is used as a reference channel within the waveguide so that changes due to the agent can be detected, and by monitoring the ratio of the detection channel output to the reference channel output the photon signal coming from the $\bar{e}$ source is normalized.

All of these configurations could work where the chamber membrane is displaced to increase or decrease chamber volume by having the actuator configured to expand, increasing volume, and contract, decreasing volume.

Furthermore, either used alone or combined with a waveguide for detection purposes, the microfluidic pump system of the invention can be further combined with a computer or an integrated processor to automate its monitoring capabilities and responses.

It is important to note that the radiant energy source (e.g. laser or photodiode), detection method, and/or processor may each be integrated into a chem/bio chip along with the microfluidic pump system itself. This is especially advantageous for applications in which the pump system is implanted in the body or within a closed assay system.

Figure 5:
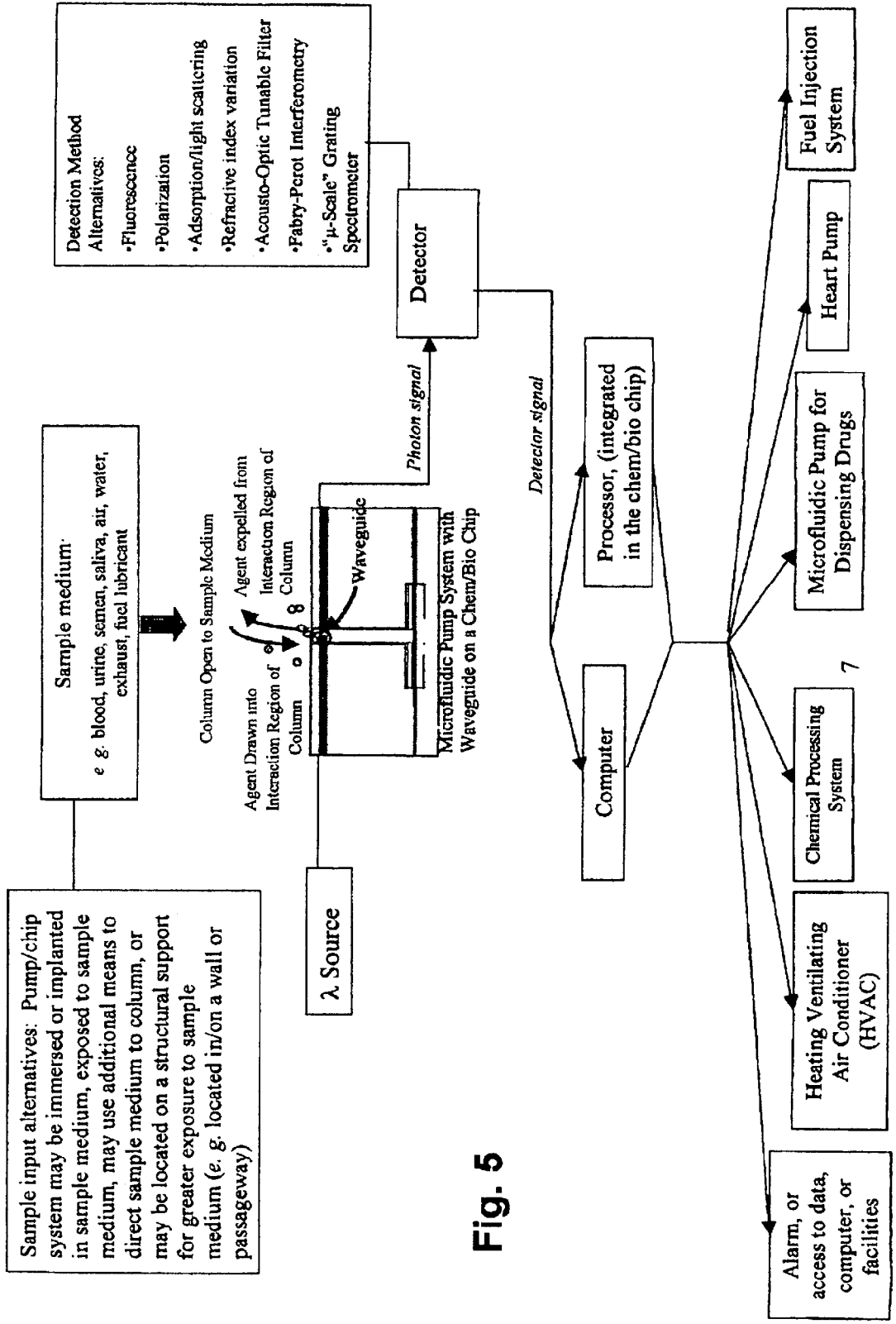

FIGS. 1–5 is an example of a preferred embodiment of the invention for use in various applications. FIGS. 1–5 shows the microfluidic pump system featuring a waveguide for the identification or detection of chemical and or biological agents. The system is integrated into a chem/bio chip, which can be implanted in the body or within a closed assay system, or can be used externally. The pump system's column is open to a sample medium and can draw fluids or gases into the interaction region of the column, which contains the waveguide sensor. A radiant energy or light source is aligned with the pump system's waveguide. Radiant energy passes through the waveguide, which then emits a photon signal. The resulting photon signal goes to a detector. Various detection methods may be used to interpret the photon signal. A list of examples of detection method alternatives appears in the figure. The detector signal can then be processed either by a computer or by a processor integrated within the bio/chem chip itself. The computer or integrated processor can thus monitor the sample and can automate a response by relaying information to another mechanism connected to the system such as an alarm, a heart pump, fuel injection system, HVAC, a chemical processing system or another microfluidic pump for dispensing drugs, to cause it to appropriately respond based on the resulting data. The appropriate automated monitoring response in these examples depends on the application or goal of the system and its connected components.

The present invention is not limited to the specific embodiments illustrated herein, which are exemplary.

I claim:

1. Miniaturized apparatus for substance assays; said apparatus comprising:
   a substrate;
   at least one microfluidic pump mounted on the substrate; and
   at least one substantially microscopic optical detector mounted on the substrate and disposed for detection of fluid displaced by the pump.

2. The apparatus of claim 1, wherein:
   the at least one pump comprises a multiplicity of pumps per square centimeter of the substrate; and
   the at least one detector comprises a multiplicity of detectors per square centimeter of the substrate.

3. The apparatus of claim 2, wherein:
   each multiplicity is at least one hundred.

4. The apparatus of claim 2, wherein:
   each multiplicity is at least one thousand.

5. The apparatus of claim 2, wherein:
   each multiplicity is at least ten thousand.

6. The apparatus of claim 1, wherein:
   said at least one detector comprises a fluorescence detector.

7. The apparatus of claim 1, wherein:
   said at least one detector comprises a polarization detector.

8. The apparatus of claim 1, wherein:
   said at least one detector comprises a refractive-index-variation detector.

9. The apparatus of claim 1, wherein:
   said at least one detector comprises an acoustooptic tunable filter.

10. The apparatus of claim 1, wherein:
    said at least one detector comprises a Fabry-Perot interferometric detector.

11. The apparatus of claim 1, wherein:
    said at least one detector comprises a microscale-grating spectrometric detector.

12. Apparatus comprising:
    multiple waveguides formed on a substrate;
    intersecting each of said waveguides, a fluid chamber for controlling radiation propagation along the respective waveguide; and
    coupled with at least certain of the fluid chambers, mechanical means for selectively displacing fluid into or out of the chambers, respectively.

13. The apparatus of claim 12, wherein:
    said mechanical means comprise means for applying force from one or more mechanical surfaces to displace the fluid.

14. The apparatus of claim 12, wherein:
    said mechanical means comprise no means for effecting a phase change in the fluid.

15. The apparatus of claim 12, wherein:
    said mechanical means comprise no means for applying an electrical field to the fluid.

16. The apparatus of claim 12, wherein:
    said mechanical means comprise no means for applying heat to the fluid.

17. Apparatus comprising:
    multiple waveguides formed on a substrate;
    intersecting each of said waveguides, a fluid chamber for controlling radiation propagation along the respective waveguide; and coupled with at least certain of the fluid chambers, means for selectively displacing fluid into or out of the chambers, respectively;

wherein the displacing means draw into the chamber fluid in which the entire apparatus is immersed.

18. The apparatus of claim 17, further comprising:

means for deriving information about radiation interaction with fluid in the chambers.

19. The apparatus of claim 18, wherein:

means for transmitting the information for reception and use outside the apparatus.

20. The apparatus of claim 19, wherein:

the substrate is a chip for disposition within a living creature; and the transmitting means comprise means for wireless transmission to a receiver.

21. The apparatus of claim 20, wherein:

the receiver is outside the living creature.

22. Apparatus comprising:

multiple waveguides formed on a substrate;

intersecting each of said waveguides, a fluid chamber for controlling radiation propagation along the respective waveguide;

coupled with at least certain of the fluid chambers, means for selectively displacing fluid into or out of the chambers, respectively;

means for coupling each of said waveguides to a radiation source; and means for coupling each of said waveguides to a radiation detector.

23. Apparatus comprising:

multiple waveguides formed on a substrate;

intersecting each of said waveguides, a fluid chamber for controlling radiation propagation along the respective waveguide; and coupled with at least certain of the fluid chambers, means for selectively displacing fluid into or out of the chambers, respectively;

wherein the substrate is a chip for circulating through a blood stream of a living creature.

24. Apparatus comprising:

multiple waveguides formed on a substrate;

intersecting each of said waveguides, a fluid chamber for controlling radiation propagation along the respective waveguide; and coupled with at least certain of the fluid chambers, means for selectively displacing fluid into or out of the chambers, respectively;

wherein the substrate is a chip for implantation in the body of a living creature.

25. A method for making miniaturized substance assays; said method comprising the steps of:

operating a membrane actuator to deflect a radiation-interacting liquid in a reservoir;

channeling liquid between the reservoir and a tubulation; said reservoir having a cross-sectional area at least one hundred times that of the tubulation; and monitoring radiation passing through the tubulation.

26. The method of claim 25, wherein:

the cross-sectional area of the reservoir is at least one thousand times that of the tubulation.

27. The method of claim 25, further comprising the step of:

applying deflected liquid in the tubulation to control movement of a specimen into or out from the tubulation.

28. Miniaturized apparatus for substance assays; said apparatus comprising:

a substrate;

at least one microfluidic pump mounted on the substrate; and at least one optical detector disposed for detection of fluid displaced by the pump.

29. The apparatus of claim 28, wherein said at least one optical detector is selected from the group consisting of:

a fluorescence detector;

a polarization detector;

a refractive-index variation detector;

an acoustooptic tunable filter;

a Fabry-Perot interferometric detector; and a microscale-grating spectrometric detector.

30. Apparatus comprising:

multiple waveguides formed on a substrate, intersecting each of said waveguides, a fluid chamber for controlling radiation propagation along the respective waveguide, coupled with at least certain of the fluid chambers, means for selectively displacing fluid into or out of the chambers, respectively, and means for detecting said controlled radiation propagated along the respective waveguide, said detecting means being selected from the group consisting of:

a fluorescence detector, a polarization detector, a refractive-index variation detector, an acoustooptic tunable filter, a Fabry-Perot interferometric detector, and a microscale-grating spectrometric detector.

31. A method for making miniaturized substance assays; said method comprising the steps of:

operating a membrane actuator to deflect a radiation-interacting liquid in a reservoir;

channeling liquid between the reservoir and a tubulation; and monitoring radiation passing through the tubulation.

32. A method for making miniaturized substance assays; said method comprising the steps of:

channeling a radiation-interacting liquid between a reservoir and a tubulation; said reservoir having a cross-sectional area at least one hundred times that of the tubulation; and monitoring radiation passing through the tubulation.

* * * * *